United States Patent
Schulz et al.

[11] Patent Number: 5,753,864
[45] Date of Patent: May 19, 1998

[54] SUPPORTING INSULATOR

[75] Inventors: Daniel Schulz, Zürich; Ales Vrana, Richterswil, both of Switzerland

[73] Assignee: Asea Brown Boveri AG, Baden, Switzerland

[21] Appl. No.: 408,350

[22] Filed: Mar. 22, 1995

[30] Foreign Application Priority Data

Apr. 8, 1994 [EP] European Pat. Off. ............. 94105435

[51] Int. Cl.$^6$ ................................................ H01B 17/56
[52] U.S. Cl. ......................... 174/167; 174/28; 174/137 R
[58] Field of Search ........................ 174/167, 16.2, 174/28, 99 B, 137 R, 137 A, 137 B, 30, 22 C, 111, 212

[56] References Cited

U.S. PATENT DOCUMENTS

| | | | |
|---|---|---|---|
| 3,573,341 | 4/1971 | Graybill | 174/28 X |
| 3,629,486 | 12/1971 | Tadworth | 174/28 |
| 3,639,671 | 2/1972 | Clark | 174/28 X |
| 3,906,149 | 9/1975 | Hashoff et al. | 174/28 X |

FOREIGN PATENT DOCUMENTS

| | | |
|---|---|---|
| 0288715B1 | 11/1988 | European Pat. Off. . |
| 53-064782 | 6/1978 | Japan . |
| 628539 | 10/1978 | U.S.S.R. . |
| 0397081 | 8/1933 | United Kingdom ...... 174/28 |
| 1133270 | 11/1968 | United Kingdom . |

*Primary Examiner*—Hyung S. Sough
*Attorney, Agent, or Firm*—Burns, Doane, Swecker & Mathis, L.L.P.

[57] ABSTRACT

A supporting insulator has an insulator body in the form of a disk and is made of a cured casting resin, and has at least one cast-in fitting to which high voltage is applied and which is cast in the insulator body and passes therethrough. The cast-in fitting has a cylindrically constructed outer surface which the insulator body encloses. A lip which tapers outwards and is closely connected to the outer surface of the cast-in fitting, is integrally formed on the insulator body. The lip mechanically decouples an edge zone of the insulator body from the actual insulator body.

7 Claims, 2 Drawing Sheets

SUPPORTING INSULATOR

BACKGROUND OF THE INVENTION

1. Field of the Invention

The invention is based on a supporting insulator.

2. Discussion of Background

A supporting insulator which is constructed in the form of a disk and has an insulator body, which is provided for use in gas-insulated switching installations, is known from European Patent Specification 0 288 715 B1. The insulator body can have a pressure medium applied to it. Insulating gases such as, for example, $SF_6$ or else mineral oil are conceivable as the pressure medium. Furthermore, a vacuum could also be applied to the insulator. The insulator body is made from a cured casting resin. A cast-in fitting passes through the insulator body. High voltage is applied to the cast-in fitting in operation, and it carries current. The cast-in fitting has a corrugated outer surface which is provided with a coupling layer which is fitted such that it is proof against the pressure medium and is constructed elastically. This elastic coupling layer is cast onto the insulator body.

Such coupling layers which are constructed elastically are highly suitable for insulators subject to a comparatively small mechanical stress. Such elastic coupling layers are no longer suitable for modern installations, in which the insulators are subject to ever greater mechanical, thermal and dielectric loads, since better adhesion is demanded between the outer surface of the cast-in fitting and the insulator body than is possible with the aid of the elastic coupling layer. In particular, it is necessary to avoid separation of the insulator material occurring in the outer edge region at the junction point between the cast-in fitting and the insulator body in the event of mechanical loads, since the breaking strength of the insulator is greatly reduced thereby.

SUMMARY OF THE INVENTION

Accordingly, one object of the invention, as it is defined in the independent claims, is to provide a novel supporting insulator which is designed for comparatively high mechanical loads, is of simple construction and in which separation of the insulating material from the cast-in fitting as a result of mechanical loads is precluded.

The supporting insulator has an insulator body, which is in the form of a disk and is made of cured casting resin, and has at least one cast-in fitting to which high voltage is applied and which is cast in the insulator body and passes through it. The cast-in fitting has a cylindrically constructed outer surface, which is enclosed by the insulator body. In the case of this supporting insulator, it is particularly advantageous for a lip, which tapers outwards and is closely connected to the outer surface of the cast-in fitting, to be integrally formed on the insulator body.

In addition, it is particularly advantageous to be able to convert already existing molds at a comparatively low cost for the production of supporting insulators which are considerably stronger in terms of cantilever strength. For this purpose, the lip is constructed as a flank of a groove which is incorporated in the insulator body and concentrically surrounds the cast-in fitting. The groove has a cross section which is constructed as a U-profile. The U-profile is constructed to be free of notches.

The cast-in fitting is manufactured from an electrically highly conductive metal or from a metal alloy, and has a silver-plated surface. Particularly good adhesion of the insulator body in the cast-in fitting is achieved in that the outer surface of the cast-in fitting is roughened and cleaned using a degreasing solvent before being cast in the insulator body.

The invention, its development and the advantages which can be achieved thereby are explained in more detail in the following text with reference to the drawing, which illustrates only one possible embodiment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Only those elements which are required for direct understanding of the invention are illustrated.

DESCRIPTION OF THE PREFERRED EMBODIMENTS

Figure 1:
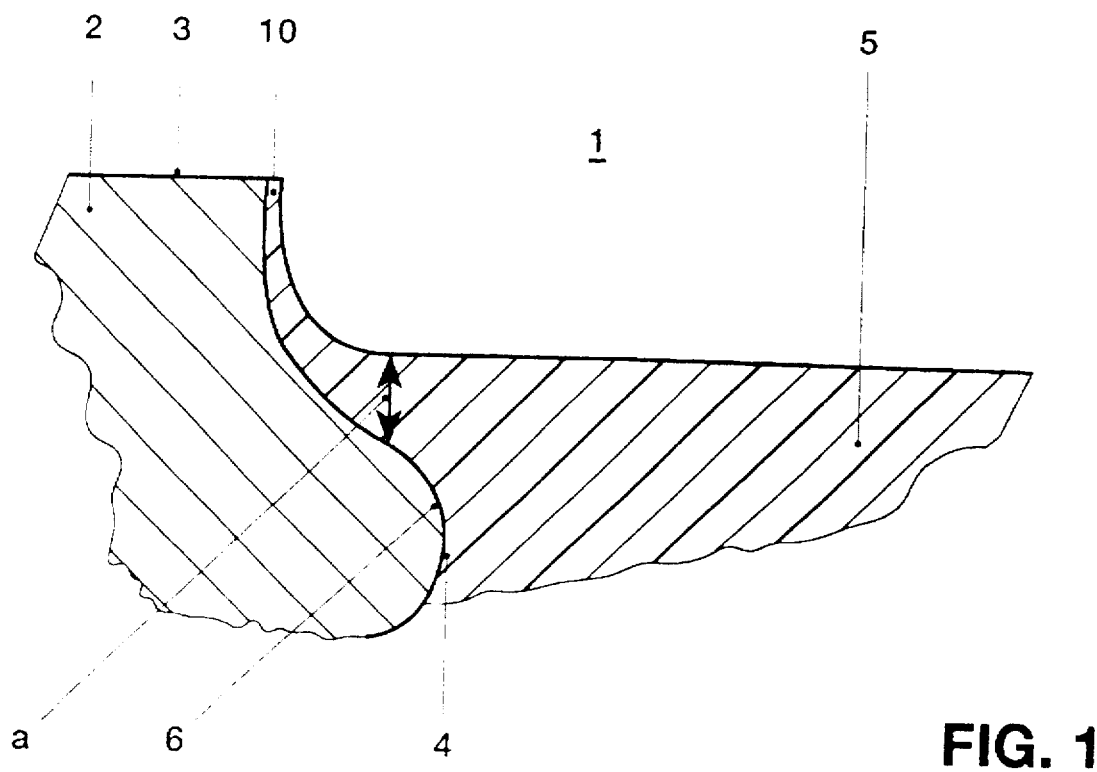
FIG. 1 shows a schematically illustrated partial section through a first embodiment of a supporting insulator in the form of a disk.

Referring now to the drawings, wherein like reference numerals designate identical or corresponding parts throughout the several views, FIG. 1 shows a schematically illustrated partial section through a first embodiment of a supporting insulator 1 which is constructed in the form of a disk, as is used, for example, in gas-insulated switching installations in order to support the active parts with respect to the grounded encapsulation. The supporting insulator 1 has at least one cast-in fitting 2 made of metal. This cast-in fitting 2 is preferably manufactured from an aluminum alloy, and has a silver-plated surface. One cast-in fitting 2 is provided per supporting insulator 1 for a single-pole, encapsulated, gas-insulated switching installation, three cast-in fittings 2, which are spaced apart from one another corresponding to the operating voltage of the gas-insulated switching installation, being required per supporting insulator 1 for a three-pole, encapsulated, gas-insulated switching installation. The cast-in fitting 2 has a flat end surface 3 on each of the two sides, which end surface 3 is provided with fastening options, which are not illustrated, for the active parts which can be connected to it. In the case of a single-pole, gas-insulated switching installation, the center axis of the supporting insulator 1 in the form of a disk passes through the cast-in fitting 2 in the center, and runs at right angles to the end surface 3 of the cast-in fitting 2. The cast-in fitting 2 has an outer surface 4 on which the insulator body 5 of the supporting insulator, which is in the form of a disk, is cast. Before the casting process, the outer surface 4 of the silver-plated cast-in fitting 2 was blasted with corundum, and it was subsequently carefully degreased in a suitable solvent bath.

Figure 3:
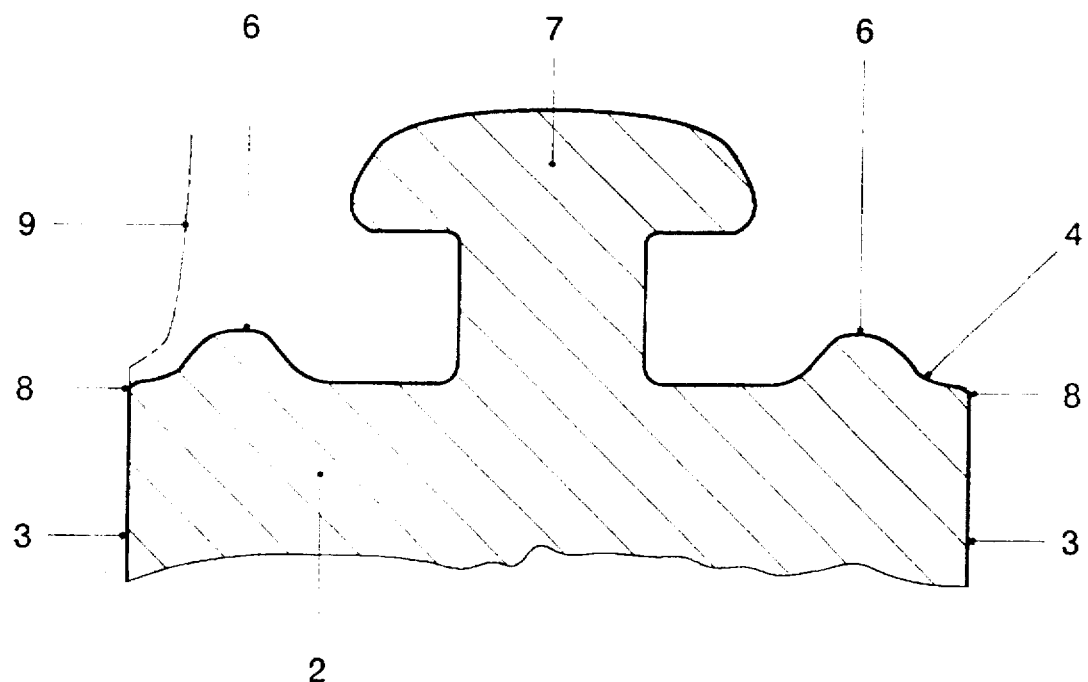
FIG. 3 shows a schematically illustrated embodiment of the surface profile of the cast-in fitting of a supporting insulator in the form of a disk.

The outer surface 4 of the cylindrically constructed cast-in fitting 2 is of corrugated construction, as the partial section in FIG. 3 shows. Only two corrugations 6 are illustrated here, by way of example. An electrode 7, which is constructed to have an approximately mushroom-shaped cross section, concentrically surrounds the cast-in fitting 2. This electrode 7 is primarily used for dielectrically favorable construction of the electric field which acts on the supporting insulator 1 in operation of the gas-insulated switching installation. The electrode 7 can either be constructed as part of the cast-in fitting 2, as illustrated schematically here, or else can be manufactured from various electrically conductive materials, such as, for example, from conductive plastic or from a sheet-metal ring which is screwed to the cast-in fitting 2 and has a corresponding profile. A comparatively small radius 8 is in each case provided as the transition from the outer surface 4 to the end surfaces 3. A dashed-dotted line 9 in FIG. 3 indicates a part of the outer contour of the insulator body 5. As can be seen in FIG. 1, a lip 10, which tapers outwards in the direction of the end surfaces 3 and is cast on the outer surface 4 of the cast-in fitting 2, is integrally formed on each of the two sides of the insulator body 5. The forming of that corrugation 6 of the cast-in fitting 2 which is adjacent to the respective lip 10, together with the forming of the surface of the insulator body 5 governs the form of the tapering lip 10.

Figure 2:
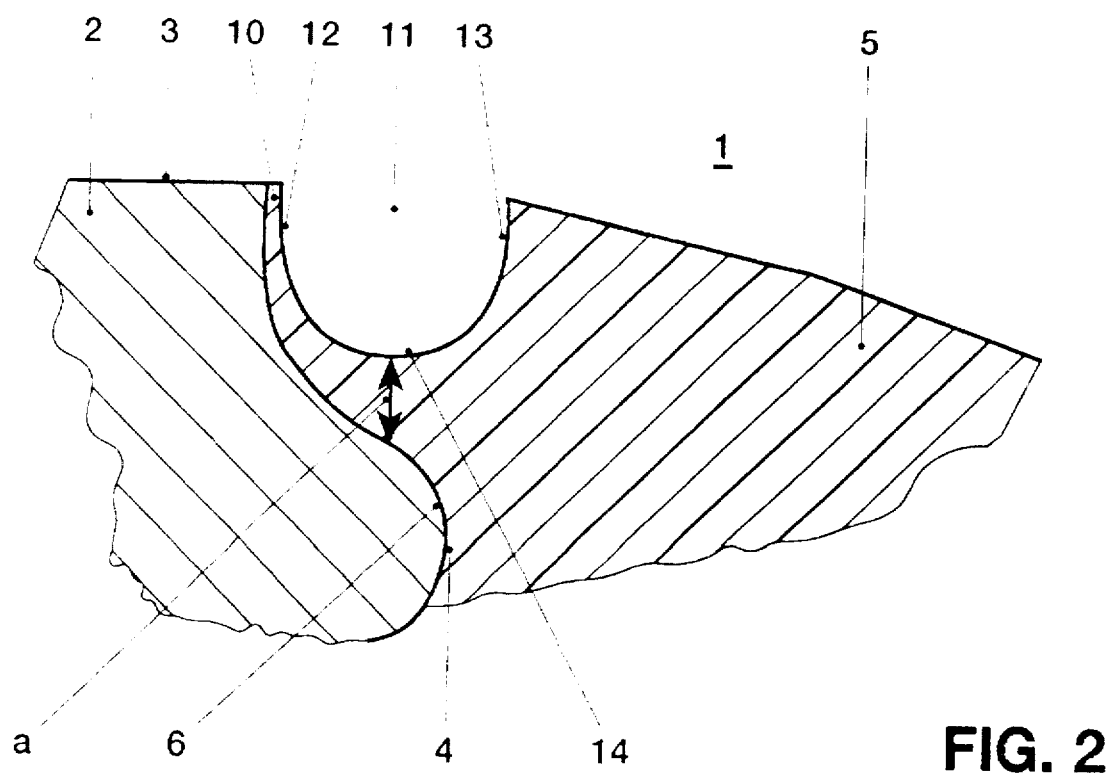
FIG. 2 shows a schematically illustrated partial section through a second embodiment of a supporting insulator in the form of a disk.

FIG. 2 shows a schematically illustrated partial section through a second embodiment of a supporting insulator 1 in the form of a disk. In this supporting insulator 1, the lip 10 bounds a groove 11 which is incorporated in the insulator body 5 and has a U-shaped cross section. The mechanical strength of this supporting insulator 1, which is in the form of a disk, is considerably improved by the groove 11 in comparison with a supporting insulator which has been cast without this groove. The flanks 12 and 13 of the groove 11, and its groove base 14 are constructed to be smooth and without any notches, so that no additional notch effect can mechanically weaken the supporting insulator 1, which is in the form of a disk. The U-profile which produces the groove 11 can be incorporated very easily into existing casting molds for conventional supporting insulators, as a result of which a mold for casting a supporting insulator 1 which is in the form of a disk and is capable of considerably greater mechanical resistance is created in a comparatively cost-effective manner.

FIGS. 1 and 2 each indicate a separation which extends parallel to the center axis of the supporting insulator 1 and is bounded by the course of the lip 10 and by the groove base 14 on one side and by the surface of the shaft 6 on the other side. If the separation a is selected to be in the region of 5 mm, which is sensible for the majority of curable casting resins now used for supporting insulators, then the lip 10 and the flank 12, which corresponds to it, of the groove 11 taper to thicknesses of a minimum of approximately 0.5 mm. The cross section of the lip 10, which is tapered from the separation a, is designed such that it cannot transmit any bending stresses, which act on the insulator body 5, outwards to the thin end of the lip 10. The edge zone of the insulator body 5, which edge zone runs out into the lip 10 or the flank 12 of the groove 11 corresponding to it, is thus highly effectively mechanically decoupled from the actual insulator body 5.

FIG. 1 will now be considered in somewhat more detail in order to explain the method of operation. The supporting insulator 1, which is in the form of a disk, is loaded by reaction forces, which are transmitted, for example, from the cast-in fitting 2 to the insulator body 5, or by forces resulting from a pressure difference between the two pressure spaces of the gas-insulated switching installation which are separated from one another by the supporting insulator 1. The outer surface 4 of the cast-in fitting 2 is constructed as a corrugated surface and can therefore absorb the axially acting forces without the insulator body 5 sliding off the outer surface 4. In addition, the supporting insulator 1 which is in the form of a disk is also loaded by bending moments, however, which are always greatest on the outside at the respective junction between the cast-in fitting 2 and the insulator body 5. The integrally formed lip 10 results in the stress distribution between the cast-in fitting 2 and the insulator body 5 being improved at this point such that no separation phenomena can occur there at the maximum bending moments which can be expected. The tapering cross section of the lip 10 cannot transmit any bending stresses, which act on the insulator body 5, outwards to the thin end of the lip 10, so that this edge zone is mechanically decoupled from the actual insulator body 5. The adhesion of the insulator body 5 on the outer surface 4 is so strong that separation between the cast-in fitting 2 and the insulator body 5 does not occur, despite the bending moments acting. In this way, the failure of the supporting insulator which occurs repeatedly in conjunction with such separation phenomena is avoided with a high level of confidence.

The cantilever strength of supporting insulators constructed in the form of columns can also be increased using the same principle.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A supporting insulator, comprising:
   a cast-in fitting having a longitudinal axis, two end surfaces disposed along the longitudinal axis, and a cylindrical outer surface extending between the two end surfaces, the outer surface having a plurality of corrugations thereon, the corrugations having innermost points and outermost points, the innermost points being closer to the longitudinal axis than the outermost points, the innermost points corresponding to two of the corrugations being disposed at the two end surfaces;
   an electrode, larger than the corrugations, disposed between two of the corrugations and concentrically surrounding part of the outer surface of the cast-in fitting; and
   an insulator body, the insulator body being cast concentrically around the cast-in fitting and the electrode, the insulator body having two sides corresponding to the two end surfaces, the insulator body having lips disposed on the sides, each of the lips having an end that extends to a point proximate a corresponding one of the two end surfaces, each of the lips extending in a direction toward a main body portion of the insulator body, away from the longitudinal axis and away from the corresponding one of the two end surfaces, and being sufficiently thin at the end such that bending stresses are not transmitted from the main body portion of the insulator body to the end.

2. The insulator body as set forth in claim 1, wherein the insulator body has at least one groove therein, the at least one groove being concentric around the cast-in fitting and having a first and a second flank, the first flank being disposed closer to the cast-in fitting than the second flank and forming the lip.

3. The insulator body as set forth in claim 2, wherein the groove is U-shaped in cross-section.

4. The insulator body as set forth in claim 1, wherein the cast-in fitting is manufactured from an electrically conductive material.

5. The insulator body as set forth in claim 1, wherein the cast-in fitting has a silver-plated surface.

6. The insulator body as set forth in claim 1, wherein an outer surface of the insulator body is roughened and cleaned using a degreasing solvent before being cast in the insulator body.

7. The insulator body as set forth in claim 1, wherein the electrode is mushroom-shaped in cross-section.

* * * * *